US007431954B2

(12) United States Patent
Ballman et al.

(10) Patent No.: US 7,431,954 B2
(45) Date of Patent: *Oct. 7, 2008

(54) FOOD PRODUCTS FORTIFIED WITH CALCIUM AND METHOD OF PREPARATION

(75) Inventors: Darryl J. Ballman, Wyoming, MN (US); Sean W. Creedon, Tewksbury, MA (US); James W. Geoffrion, Anoka, MN (US); Thomas D. Hede, Andover, MN (US); Mathew F. Langenfeld, Rosemount, MN (US); Jonathan E. Trautz, Maple Grove, MN (US)

(73) Assignee: General Mills Holdings II, LLC, Minneapolis, MN (US)

( * ) Notice: Subject to any disclaimer, the term of this patent is extended or adjusted under 35 U.S.C. 154(b) by 420 days.

This patent is subject to a terminal disclaimer.

(21) Appl. No.: 11/168,308

(22) Filed: Jun. 29, 2005

(65) Prior Publication Data

US 2005/0238760 A1    Oct. 27, 2005

Related U.S. Application Data

(63) Continuation of application No. 10/275,444, filed as application No. PCT/US01/13067 on Apr. 23, 2001, now Pat. No. 6,913,775, which is a continuation-in-part of application No. 09/565,869, filed on May 5, 2000, now abandoned.

(51) Int. Cl.
*A23L 1/304* (2006.01)

(52) U.S. Cl. .................. 426/74; 426/271; 426/520; 426/619; 426/620; 426/621

(58) Field of Classification Search ............... 426/74, 426/271, 619, 620, 621, 520
See application file for complete search history.

(56) References Cited

U.S. PATENT DOCUMENTS

| | | |
|---|---|---|
| 1,163,175 A | 12/1915 | Bullman |
| 2,098,544 A | 11/1937 | Hill |
| 2,166,797 A | 7/1939 | Collatz |
| 2,239,543 A | 4/1941 | Andrews et al. |
| 2,600,532 A | 6/1952 | Hale et al. |
| 2,707,153 A | 4/1955 | Bettman |
| 2,743,685 A | 5/1956 | Hale et al. |
| 2,788,277 A | 4/1957 | Huber |
| 2,991,181 A | 7/1961 | Benjamin |
| 3,557,718 A | 1/1971 | Chivers |
| 3,565,559 A | 2/1971 | Sato et al. |
| 3,615,676 A | 10/1971 | McKown et al. |
| 3,620,762 A | 11/1971 | Yoshida et al. |
| 3,622,344 A | 11/1971 | Allingham |
| 3,726,693 A | 4/1973 | Harris |
| 3,764,343 A | 10/1973 | Paugh |
| 3,814,822 A | 6/1974 | Henthorn et al. |
| 3,878,305 A | 4/1975 | Damico et al. |
| 3,930,027 A | 12/1975 | Kelly et al. |
| 3,952,115 A | 4/1976 | Damico et al. |
| 4,079,151 A | 3/1978 | Schade et al. |
| 4,089,984 A | 5/1978 | Gilbertson |
| 4,338,339 A | 7/1982 | Edwards |
| 4,378,377 A | 3/1983 | Gajewski |
| 4,485,120 A | 11/1984 | Gantwerker et al. |
| 4,497,840 A | 2/1985 | Gould et al. |
| 4,540,587 A | 9/1985 | Gajewski |
| 4,614,657 A | 9/1986 | Sheng et al. |
| 4,702,925 A | 10/1987 | Verrico |
| 4,755,390 A | 7/1988 | Calandro et al. |
| 4,856,453 A | 8/1989 | Verrico |
| 4,857,339 A | 8/1989 | Maselli et al. |
| 4,859,477 A | 8/1989 | Augustine et al. |
| 4,880,645 A | 11/1989 | Carpenter et al. |
| 4,906,482 A | 3/1990 | Zemel et al. |
| 4,988,521 A | 1/1991 | Fan |
| 4,994,283 A | 2/1991 | Mehansho |
| 5,005,514 A | 4/1991 | Verrico |
| 5,023,024 A | 6/1991 | Kyogoku et al. |
| 5,093,146 A | 3/1992 | Calandro et al. |
| 5,258,187 A | 11/1993 | Shimada |
| 5,270,063 A | 12/1993 | Wullschleger et al. |
| 5,275,831 A | 1/1994 | Smith et al. |
| 5,306,519 A | 4/1994 | Peterson et al. |

(Continued)

FOREIGN PATENT DOCUMENTS

| | | |
|---|---|---|
| GB | 2079129 | 1/1982 |
| JP | 60130353 | 7/1985 |
| WO | 9418851 | 9/1994 |
| WO | WO 9418851 | 9/1994 |
| WO | 0121016 | 3/2001 |
| WO | WO 0121016 | 3/2001 |
| WO | 0184953 | 3/2002 |

OTHER PUBLICATIONS

Barrett et al., "Extrudate Cell Structure—Texture Relationships", Journal of Food Science, vol. 57, No. 5, pp. 1253-1257, 1992.

*Primary Examiner*—Helen F Pratt
(74) *Attorney, Agent, or Firm*—John A. O'Toole; Douglas J. Taylor; Everett G. Diederiks

(57) ABSTRACT

Cooked cereal dough products are provided that are fortified with calcium from multiple sources, at least a major portion of which is supplied by calcium phosphate salts having an median particle size of 2 to 15 μm. Dried cereal finished products such as Ready-To-Eat breakfast cereals are fabricated from cooked cereal doughs that can comprise even lightly colored cereal materials. Methods for preparing such calcium fortified cooked cereal compositions and dried cereal finished food products essentially comprise: A. providing a calcium fortified cooked cereal dough or mass containing multiple calcium sources, at least a portion of which is supplied by calcium phosphate; B. forming the lightly colored calcium fortified cereal dough into pieces; and, C. drying the pieces to form the finished food products fortified with high levels of calcium, preferably puffed RTE cereal pieces.

21 Claims, No Drawings

U.S. PATENT DOCUMENTS

| | | |
|---|---|---|
| 5,342,188 A | 8/1994 | Zimmerman |
| 5,449,523 A | 9/1995 | Hansen et al. |
| 5,510,130 A | 4/1996 | Holtz et al. |
| 5,514,387 A | 5/1996 | Zimmerman et al. |
| 5,516,541 A | 5/1996 | Breslin et al. |
| 5,631,034 A | 5/1997 | Trumbetas et al. |
| 5,645,878 A | 7/1997 | Breslin et al. |
| 5,695,805 A | 12/1997 | Borek et al. |
| 5,698,252 A | 12/1997 | Kelly et al. |
| 5,707,448 A | 1/1998 | Cordera et al. |
| 5,709,902 A | 1/1998 | Bartolomei et al. |
| 5,798,132 A | 8/1998 | Chen et al. |
| 5,945,144 A | 8/1999 | Hahn et al. |
| 6,139,886 A | 10/2000 | Green et al. |
| 6,174,553 B1 | 1/2001 | Cerda et al. |
| 6,210,720 B1 | 4/2001 | Leusner et al. |

FOOD PRODUCTS FORTIFIED WITH CALCIUM AND METHOD OF PREPARATION

CROSS REFERENCE TO RELATED APPLICATIONS

The present application constitutes a continuation of U.S. patent application Ser. No. 10/275,444, filed Jan. 27, 2003, pending, which represents a national stage filing of PCT/US01/13067, filed Apr. 23, 2001 now U.S. Pat. No. 6,913,775, which is a continuation-in-part of application Ser. No. 09/565,869, filed May 5, 2000, abandoned.

FIELD OF THE INVENTION

The present invention is directed generally to food products and to their methods of preparation. In particular, the present invention is directed to improved puffed Ready-To-Eat cereal products fortified with high levels of calcium and to processes for making such improved calcium fortified cereal products.

BACKGROUND

Ready-To-Eat ("R-T-E") breakfast cereal have long been fortified with various vitamins and minerals including calcium. For example, U.S. Pat. No. 2,166,797 ("Process of Fortifying Cereals Products with Minerals" issued Jul. 18, 1939) teaches a 50:50 mixture of sodium phosphate with calcium carbonate to provide about 0.1% calcium). Health and nutrition interests have recently focused upon increasing the calcium content of foods and in R-T-E cereals in particular. The present invention provides improvements in the mineral fortification of cooked cereal products such as puffed R-T-E cereals and fried snacks. In particular, the present invention provides improvements in providing puffed R-T-E cereals with high levels of calcium.

For adults, recent medical studies have indicated that a diet containing the U.S. recommended daily allowance (RDA) of calcium might be effective in preventing or mitigating osteoporosis, and also possibly high blood pressure and colon cancer. Calcium is also of particular nutritional value in growing children to support bone growth. There is therefore great public interest in the preparation and consumption of food products that will supply the recommended daily allowance of calcium.

In view of the desire for introducing more calcium into diets, especially children's diets, it would be desirable if such R-T-E cereal products were fortified with supplemental calcium to provide high levels of calcium. The current recommended daily allowance for adults is 1000 mg of Ca. By "high levels" as used herein is meant a product that provides at least 20% of the recommended daily allowance of calcium (200 mg Ca) in a single serving of food product. By current food labeling regulations, such products can be characterized as an "excellent" source of calcium as compared to those products that supply only 10% or 100 mg calcium which can only be described as a "good" source of calcium. For R-T-E cereals "high levels" means having at least 0.65% elemental calcium (dry weight) or about 200 mg calcium per serving (typically about 30 g of product) of R-T-E cereal.

Calcium can be added in limited amounts to R-T-E cereal products. However, at higher levels of calcium fortification, the presence of such high amounts of calcium ingredients can adversely interfere with other desired characteristics. For example, high levels of added calcium ingredients can negatively affect the taste, texture, color or density of the R-T-E cereal products.

One approach is to providing higher levels of calcium fortification is to employ calcium carbonate as the calcium ingredient. Calcium carbonate is preferred in large part since its calcium level is quite high (about 40%). Also, calcium carbonate is insoluble and relatively inert in conventional cereal processing operations. Moreover, $CaCO_2$ is an inexpensive sources of calcium.

Among the various types of R-T-E cereal products, puffed R-T-E cereals are especially popular with children. Thus, it would be desirable to provide puffed R-T-E cereal with high levels of calcium fortification. Calcium carbonate has been used to provide calcium fortification to R-T-E cereals but at lower levels (i.e. under 0.5% calcium). However, puffed R-T-E cereals are especially difficult to fortify with high levels of calcium incorporated into the cooked cereal dough. For example, when $CaCO_2$ is used to provide the calcium, the calcium ingredient acts as a leavening agent and can cause over leavening of the puffed pieces even when conventional leavening ingredients are not added. Both product appearance and texture can be adversely affected. Counterintuitively, over leavening can actually result in under expansion. One technique involves applying a topical coating especially a sugar coating to provide the desired level of calcium fortification (see, for example, co-pending commonly assigned U.S. Ser. No. 09/503,953, entitled "Presweetened Ready to Eat Cereals Fortified with Calcium and Methods of Preparation", filed Feb. 14, 2000 and incorporated herein by reference). While useful to provide calcium fortification for those puffed R-T-E cereals intended to be presweetened, not all puffed R-T-E cereals are presweetened.

Extruders are often used in the preparation of various food products and especially in the preparation of ready-to-eat ("R-T-E") cereals such as puffed products. Extruders, especially cooker extruders, are desirable because a single machine can produce large quantities of a cooked cereal dough in a short period of time. Such cooker extruders can be used to prepare cooked dough extrudates which can thereafter be formed into individual cereal or snack pieces, with the formation of such pieces possibly involving puffing the pieces to form finished puffed R-T-E cereals. In another variation that is increasingly popular, the conditions of the extruder and the cooked cereal dough are such that the dough puffs immediately upon being extruded and is cut into individual puffed pieces at the die head. Such a process is referred to generally as "direct expansion". However, the problems in controlling expansion of cooked cereal doughs by direct expansion are even more severe when calcium carbonate is added to the cooked cereal dough at levels sufficient to provide high levels of calcium.

Still another problem is that such puffed R-T-E cereal products are often fabricated from lightly colored cereals such as rice and/or corn since such lightly colored and flavored cereal materials are popular with children due to the absence of a strong grain flavor. However, for lightly colored cereals such as than that are rice and/or corn (maize) based, calcium fortification can result in development of off-colors especially when $CaCO_2$ is used to provide the calcium.

In view of the current interest in providing R-T-E cereals having high levels of calcium fortification, it would thus be desirable to provide puffed R-T-E cereal products fabricated from cooked cereal doughs formulated to comprise high levels of calcium. Surprisingly, the multiple problems of incorporating high levels of calcium can be overcome. The present invention resides in important part in the selection of insoluble calcium phosphate salts of particular particle size level for incorporation at high levels in cooked cereal doughs.

More surprisingly, by selecting these particular materials, puffed R-T-E cereals can be prepared by direct expansion from twin screw extruders.

Still another advantage is that such high levels of calcium fortification can be provided in puffed R-T-E cereals prepared by direct expansion using twin screw extruders of cooked cereal doughs comprising lightly colored and flavored cereals such as corn and rice without discoloration.

These and other advantages and benefits are taught and described in the following specification.

SUMMARY OF THE INVENTION

In its product aspect, the present invention provides cooked cereal compositions such as cooked cereal doughs fortified with at least a 0.65% calcium supplied by calcium phosphate salts and further provides dried finished cereal food products fabricated therefrom such as puffed R-T-E cereals and puffed grain based snacks.

The dried cereal finished products are fabricated from cooked cereal doughs that can comprise wheat, rye, and even lightly colored cereal materials such as rice, oats and/or corn and minor levels of other conventional cereal ingredients and at least 0.65% calcium (dry weight basis) cereal supplied by calcium phosphate salts. Notwithstanding high concentrations of the calcium, the finished fortified cereal products are not only organoleptically desirable but also almost indistinguishable from their unfortified counterparts especially in terms of color appearance. The calcium phosphate salts have an median particle size ranging from about 2 to 12 microns.

In its method aspect of one and the same invention, the present invention resides in as methods for preparing such calcium fortified cooked cereal compositions and dried cereal finished food products.

In the preferred embodiment, the methods of providing finished products essentially comprise the steps of:

A. providing a cooked calcium fortified cereal dough or mass having a moisture content of about 18% to 30% moisture, and sufficient amounts of a calcium phosphate salt to provide a total calcium content of at least 0.8% (dry weight basis);

B. forming the calcium fortified cereal dough or mass into calcium fortified cereal dough pieces; and, C. drying the calcium fortified cereal dough pieces to form the finished cooked cereal dough products fortified with high levels of calcium.

DETAILED DESCRIPTION OF THE INVENTION

The present invention relates to cooked cereal doughs containing high levels calcium at least a majority of which is provided by calcium phosphate salts, to finished dried cooked cereal dough based products prepared therefrom such as R-T-E cereals, and to methods for the preparation of the doughs and finished products. Each of these product constituents, as well as methods for their preparation and use are described in detail below.

Throughout the specification and claims, percentages are by weight and temperatures in degrees Fahrenheit unless otherwise indicated.

The present products include cooked cereal doughs, intermediate dough products such as cereal pellets or snack food half products and finished dried food products prepared therefrom. While in the current description particular attention is paid to the provision of such finished cooked cereal dough products such as Ready-To-Eat or breakfast cereals and to fried or baked snacks, the skilled artisan will appreciate that the present invention finds suitability for use in connection with the provision of a variety of other food products from cooked cereal doughs. For example, baked or expanded products in the form of breakfast or quick bread bars or cylinders. Also, while the present invention is particularly directed towards the provision of food products intended for human consumption having the particular higher organoleptic qualities such human food products require, the present invention can also find suitability for use in the provision of food products intended for animal consumption such as pet foods.

Broadly, the present invention provides food compositions that essentially comprise a cooked cereal dough or cereal mass containing or fortified with about 0.65% to about 10% calcium.

The cereal and snack food art is replete with teachings on cooked cereal doughs and the skilled artisan will have no trouble formulating and preparing a cooked cereal dough. Generally, a cooked cereal dough can be prepared by blending various dry cereal ingredients together with water and cooking to gelatinize the starchy components and to develop a cooked flavor. The cooked material can also be mechanically worked to form a cooked cereal dough. The cooking and mechanical work can occur simultaneously or sequentially. The dry ingredients can also include various additives such as sugar(s), salt and mineral salts, e.g., trisodium phosphate, and starches. In addition to water, various liquid ingredients such as corn (maize) or malt syrups can be added.

An essential component of the present cooked cereal doughs is a starchy cereal ingredient. The starchy cereal ingredient can comprise any conventionally employed starchy cereal or, synonymously, farinaceous material, for use in a ready-to-eat cereal. Exemplary suitable starchy cereals include cereal grains, cut grains, grits or flours from wheat, rice, corn (maize), oats, barley, rye, triticale or other cereal grains and mixtures thereof. The flours can be whole flours or flour fractions such as with the germ fraction or husk fraction removed or, alternatively, brans. Of course, the R-T-E cereal art is well developed and the skilled artisan will have no difficulty selecting suitable farinaceous materials for use herein.

The starchy cereal component(s) can comprise from about 40 to about 99% (dry basis) of the cooked cereal dough composition. Better results in terms of organoleptic attributes and reductions in R-T-E cereal piece frangibility are obtained when the cereal ingredient(s) comprises about 75 to 95% of the cooked cereal dough composition. For best results the cereal ingredients comprise about 80 to 95% of the present cereal products.

The present cooked cereal dough products can optionally additionally comprise minor amounts such as 1% to 30%, preferably about 1% to 12%, of one or more supplemental starchy cereal components. The starchy cereal component can comprise any conventionally employed starchy cereal or, synonymously, farinaceous material, for use in a ready-to-eat cereal. Exemplary suitable starchy cereals include cereal grains, cut grains, grits or flours from wheat, rice, corn, oats, barley, rye, triticale or other cereal grains and mixtures thereof. The flours can be whole flours or flour fractions such as with the germ fraction or husk fraction removed or, alternatively, brans.

In certain embodiments, the cooked cereal dough can be formulated to be more readily puffable such as by deep fat frying, microwave heating, gun puffing, jet zone heating, direct expansion, etc. More easily puffed doughs can have high levels of amylopectin-type starch supplied either by selection of high amylopectin containing starchy cereal materials, or by addition of pure amylopectin starches or both. By high amylopectin level herein is meant greater than 20% up to about 80% by weight (dry basis). In still other variations, the puffed cereal pieces can comprise pure starches or pure modified starches to assist in providing desired puff volumes. Of course, the R-T-E cereal art is well developed and the skilled artisan will have no difficulty selecting suitable farinaceous and/or starchy materials (e.g., potato starch) for use herein.

The cooked cereal dough additionally comprises about 3% to 35% moisture. The particular moisture content depends, in part, upon the particular cereal ingredients, desired finished products, cooking equipment and techniques employed. The present invention further comprises cooked cereal dough intermediate products of varying moisture content such as cereal dough pellets and dried cereal pellets.

The present cooked cereal compositions essentially comprise about 0.65% to about 10% by weight (dry basis), i.e., up to about 3 g/oz, of calcium. Better results in terms of balancing the health benefits efficacy, especially antihypercholesterolemic activity, balanced with acceptable organoleptic attributes are obtained when the added calcium is present at a concentration range of from about 0.8 to 5% by dry weight of the cereal, preferably about 1% to 3.5%. Since the natural calcium content of most cereal grains is much less than 0.1%, and added calcium from water added during cooking is small, the total measurable calcium content of the finished product will closely approximate the added calcium material.

Useful herein to provide the calcium fortifications are insoluble mineral calcium phosphate salts. Such calcium phosphate salts provide high levels of calcium and are relatively inexpensive. Moreover, such calcium phosphate salts can be used to provide calcium at high fortification levels with an acceptable taste, color and texture.

Calcium phosphate is generally available as a monobasic ($CaH_4(PO4)_2 \cdot H_2O$), dibasic ($CaHPO_4 \cdot 2H_2O$) or tribasic ($Ca_3(PO_4)_2$) salts. Preferred for use herein is tricalcium phosphate ("TCP") $Ca_3(PO_4)_2$, (sometimes referred to as tricalcium orthophosphate), because of its high weight percentage of calcium (about 38%). A useful tricalcium phosphate starting material is also known as tribasic calcium and is available in food chemicals codex grade from Monsanto or Rhone Poulenc, having the general formula $3Ca_3(PO_4)_2 \cdot Ca(OH)_2$. This product provides assayed calcium content of from 34 to 40% by weight. Less preferred but nonetheless useful herein is anhydrous dicalcium phosphate, also known as anhydrous dibasic calcium phosphate, having a formula of $CaHPO_4$. An anhydrous dicalcium phosphate material is also available from Stauffer in food chemical codex grade, providing an assay calcium content from about 30 to about 31.7% calcium by weight. Other calcium phosphate hydrates also can be useful, including, but not limited to, calcium pyrophosphate, calcium hexametaphosphate and monobasic calcium phosphate.

If desired, the cooked cereal doughs and finished products prepared therefrom can further comprise supplemental calcium fortification from other less desirable insoluble calcium ingredients. Useful herein to supply the supplemental calcium levels are calcium ingredients that provide at least 20% of their weight of calcium. In certain embodiments, a portion of the calcium can be provided by calcium carbonate $CaCO_2$. A good material, for example, is precipitated $CaCO_2$ available from Mays Chemical Indianapolis Ind. However, the total calcium carbonate level is desirably less than 0.5% since calcium carbonate at higher levels can excessively leaven puffed cereal dough products. When present, better results are generally obtained with calcium phosphate salt(s) providing a majority of the calcium fortification, e.g., the weight ratio of calcium phosphate to $CaCO_2$ should be at least 1:1 and preferably greater than or equal to 2:1.

In conventional practice in providing direct expanded puffed pieces, a leavening agent is typically added to provide for sufficient leavening to obtain desired product attributes such as average cell size and cell size distribution. Generally, such leavening acts to reduce increase the number of cells and thus reduces the average cell size for a given finished product density. As more insoluble calcium is added, cell size decreases. To partially compensate, all or a portion of the conventionally employed leavening call be removed from the dough formulation. However, as more calcium is added to the formulation, the affect of the added calcium eventually overcomes the reduction by reducing or eliminating the conventional leavening ingredients. By excessively leavening is meant that the average cell size of puffed products decreases to below desired levels adversely affecting product texture, appearance and identity. Surprisingly, calcium phosphate salts and tricalcium phosphate in particular have a reduced tendency to leaven the puffed cereal dough at equivalent median particle sizes compared to $CaCO_2$. Thus, more tricalcium phosphate can be added to the formulation to provide higher levels of calcium fortification before reaching the overleavening cut-off even though $CaCO_2$ has a higher level of calcium.

The skilled artisan will appreciate that while these calcium phosphate salts and $CaCO_2$ are characterized herein as insoluble, of course, some small percentage will dissolve in water depending in part upon the temperature and pH.

Soluble calcium salts such as calcium lactate or calcium citrate typically are expensive and contain low weight percentages of calcium. While calcium chloride is an exception to this generalization, addition of significant calcium levels supplied by calcium chloride imparts an unacceptable bitter flavor to cooked cereal dough. In addition, by adding sufficient amounts of many of these soluble calcium salts to achieve the desired fortification level, the finished product may exhibit an undesirably dry texture and gritty mouth feel. Thus, in highly preferred embodiments, the present food products are essentially free (i.e., less than 0.1%) of added soluble calcium salts.

The insoluble calcium ingredient regardless of source or type is further preferably characterized by a particularly fine particle size. Such a fine or flour form of the calcium ingredient provides a particle size such that median particle size is less than 2 to 15 microns. Of course, some small fraction of particles may be smaller or larger than the 2 or 15 microns. Selection of such a fine particle size allows for inclusion of the particulate material without imparting an undesirable gritty mouthfeel as well as avoiding an excessive leavening affect that could adversely affect texture and appearance. For example, a useful tricalcium phosphate material (commercially available from Rhodia, Inc. Chicago Ill.) is described in product literature as having a median size of about 6.7 microns but having about 10% of particles below 1.7 microns and 10% higher than 27.8 microns)

Even more preferred for use herein are calcium ingredients having a median particle of 5 to 12 μm and for best results about 8 to 10 μm.

It is an advantage herein that calcium can be subjected to, but does not require, a cooking step. Thus, the calcium material can be added to the dry materials that are cooked and worked to form a cooked cereal dough or can be added subsequent to the formation of a cooked cereal dough, or both.

If desired, the present cereal dough composition can additionally comprise about 0.1 to about 15% (dry weight) by weight sugar(s), preferably about 0.5% to 5%, or, synonymously herein, nutritive carbohydrate sweetening agents. Such materials are also well known in the R-T-E cereal art. Useful herein as the sugar component is sucrose. However, the sugar(s) component can additionally comprise conventional fructose, maltose, dextrose, honey, fruit juice solids, brown sugar, and the like. In addition to providing desirable sweetness, the sugar component additionally beneficially affects the cereal color and texture. Better results are obtained, especially for R-T-E cereal products, when the sugar(s) component comprises from about 1% to about 10% by weight of the composition.

If cooked cereal dough products having high protein levels or high levels of soy isoflavones are desired, then the cooked cereal dough can further comprise about 1% to about 40% of a soy ingredient such as soy flour, soy protein, soy protein isolate and mixtures thereof.

In a preferred embodiment for ready-to-eat cereals, the present cereal compositions are further essentially defined in part by low fat levels, i.e., the present cereals do not comprise added or absorbed fat. Thus, the total fat or lipid component is quite low. The fat content results from the native fat associated with the starchy cereal component(s). Permissible low fat additions can also result from adding emulsifiers and from vitamin or flavor addition. However, the total fat content of the cereal compositions should be less than about 3%, preferably less than about 2%. Preferably, the R-T-E cereal is substantially free of any fat or oil incorporated into the cooked cereal dough. Such "added fat" is to be distinguished from "absorbed fat" that is picked up during deep fat frying used to prepare finished snack products herein. In more preferred embodiments, R-T-E cereals are further characterized as free of any absorbed fat.

If desired, the present cereal dough composition can additionally include a variety of materials designed to improve the aesthetic, organoleptic or nutritional qualities of the cereal. These adjuvant materials can include vitamin especially selected B vitamins, e.g., riboflavin and/or other mineral fortification (e.g., magnesium, iron, selenium, and/or chromium), colors, flavors, high potency sweetener(s), and mixtures thereof. The precise ingredient concentration in the present cereal composition will vary in known manner. Generally, however, such materials can each comprise about 0.01% to about 2% dry weight of the cereal composition. Conventional methods and techniques of vitamin fortification can be used herein. Due in part to their heat sensitivity, vitamin fortification especially of heat sensitive vitamins is typically practiced by topical application to the R-T-E cereal and such a technique is preferred herein.

One especially useful material is common salt. Desirably, the salt comprises about 0.1 to 2%, preferably about 0.5 to 1.0% of the cereal composition.

Still another highly preferred ingredient is a malt syrup flavor ingredient. The malt syrup comprises about 1 to 8% (dry basis), preferably about 2 to 5%.

Fiber, especially insoluble fiber, is believed to adversely affect selected mineral and vitamin absorption. Accordingly, in highly preferred embodiments, the present cooked cereals have a insoluble fiber content of less than 5%. If high fiber products are desired, then the cooked cereal dough can comprise about 0.1% to 5% of insulin.

Since in the preferred embodiment, the calcium material is tricalcium phosphate, such compositions can be further characterized as being essentially free of calcium sequestrants that are useful when high levels of calcium carbonate are used in cooked cereal doughs especially of lightly colored cereal materials such as corn and/or rice.

Especially in the provision of puffed cooked cereal dough pieces prepared by direct expansion from twin screw extruders, still another useful ingredient is a leavening agent such as sodium bicarbonate. Even though the calcium phosphate salts and $CaCO_2$ act as leavening agents, and can at high levels act as to overleaven the puffed dough, nonetheless, some sodium carbonate can be added to provide some fine degree of cell size control. The leavening can be present at about 0.01% to about 1%, preferably about 0.01% to 0.1%. The very high levels of sodium carbonate are for those products in which a particular alkaline flavor is desired in addition to a puffed texture, i.e., the sodium carbonate is present for dual functions.

Method of Preparation

In the preferred embodiment, the present methods essentially comprise a first step of providing a cooked cereal composition such as a cereal dough or cereal mass containing calcium within the herein specified ranges.

The present raw cereal components and other ingredients can be cooked and worked to form the present cooked cereal doughs by conventional cooked cereal dough preparation methods. The total moisture addition is controlled to provide a cooked cereal comprising about 10 to 35% moisture, preferably about 22 to 30% moisture.

The cereal dough cooking step can be practiced using a batch, atmospheric cooker and a low pressure extruder cooker especially those equipped with a conditioner precooker, or a twin screw extruder. The cereal is cooked with steam and sufficient amounts of added water for times and at temperatures sufficient to gelatinize the cereal starch and to develop desired levels of cooked cereal flavor.

Thus, in one preferred embodiment, the calcium materials can be added to the cereal and other dry ingredients prior to cooking. The calcium bearing dry blend of cereal ingredients can then be combined with water, heated to cook and gelatinize the starchy constituents and mechanically worked to form a cooked cereal dough fortified with calcium.

In one variation of this embodiment, the cereal ingredients are cooked in a cooker such as a single or, in a preferred embodiment, in a twin screw cooker extruder to form a cooked cereal dough.

A cooked cereal mash is quite similar except that larger sized particles such as whole grains or cut grains are cooked rather than cereal flour ingredients.

The cereal dough cooking step can be practiced using a batch, atmospheric cooker and a low pressure extruder cooker especially those equipped with a conditioner precooker, or a twin screw extruder. The cereal is cooked with steam and sufficient amounts of added water for times and at temperatures sufficient to gelatinize the cereal starch and to develop desired levels of cooked cereal flavor.

In another variation, a cooked cereal dough is prepared that does not include calcium. In this variation, the calcium is added afterwards to the dough. The calcium can be added in solid form or dispersed in small or minimal amounts of water or oil and admixed with the cooked cereal dough to form the calcium fortified dough. Conveniently, the calcium can be worked into the dough in a pellet forming device that transforms the dough into individual sized and shaped pieces.

In still another variation, a portion of the calcium is added with the other dry cereal ingredients that are admixed with water, cooked and worked to form a partially fortified dough. Then, the balance of the calcium can be admixed with the dough to prepare an calcium containing dough fortified to desired levels.

Forming into Desirably Shaped and Sized Pieces

The present methods further essentially comprise the step of forming the dough into individual pieces of desirable shape and size. Conventional techniques and equipment can be employed to practice this step and the skilled artisan will have no difficulty in selecting those suitable for use herein.

The present cereal compositions can be fabricated into any of a variety of common R-T-E cereal forms including, shreds, biscuits, mini biscuits, flakes, or any common R-T-E cereal or cereal based snack product form, shape or size. The present cereal compositions can also be formulated and fabricated so as to provide puffed cereals of various shapes and sizes such as "O's". Especially desirable for use herein are puffed pieces, especially puffed spherically shaped pieces.

For example, a great number of R-T-E cereals and snack products are prepared from cooked cereal doughs that are formed into pellets. The cooked cereal dough can be fed to a pellet former to form pellets. For example, in the preparation of R-T-E cereals in flake form, the pellets are sized to have a pellet count of about 35 to 50 per 10 g and a moisture content of 16 to 20%. The pellets can then be formed into "wet" flakes having a thickness of about 380 to 635 µm (0.015 to 0.025 inch), preferably while warm 76.6 to 87.8° C. (170 to 190° F.) to form desirably shaped and sized wet flakes.

In still another variation, the calcium fortified cooked cereal dough can be sheeted to form sheets of dough (e.g., 25 to 800 microns in thickness) and the individual pieces formed by cutting the sheet into individual pieces or by stamping out shaped pieces from the dough sheet.

In still another variation, the cooked cereal dough can be extruded through a die imparting a desired peripheral shape to form an extrudate cooked cereal dough rope. The dough rope can be cut to form individual shaped pieces.

For example, the dough having a moisture content of about 25% to 30% is first partially dried to a partially dried dough having a moisture content of about 12% to 20%. The partially dried dough can then be fed to piece forming apparatus that form the partially dried dough into individually shaped and sized pieces.

In still another variation, the cooked cereal dough can be fed to a biscuit forming device (see, for example, U.S. Pat. No. 5,342,188, entitled "Device For Crimping and Cutting Dough Ropes, issued Aug. 30, 1994 to C. E. Zimmermann, which is incorporated herein by reference) which forms the dough into minibiscuit shaped individual pieces.

In other variations, the cooked cereal dough is formed into individual "O" shaped pieces or rings, biscuits, minibiscuits (whether or not filled), shredded biscuits, shredded mini biscuits, rings, alphanumerics such as letters, figurines, spheres, shreds, figurines, spheres or other geometric shapes, nuggets, or even irregular shapes or mixtures thereof.

The present cereal compositions can be fabricated into any of a variety of common R-T-E cereal or snack forms including, shreds, biscuits, flakes, rings, or any common R-T-E cereal or cereal based snack product form, shape or size. The present cereal compositions can also be formulated and fabricated so as to provide puffed cereals of various shapes and sizes such as "biscuits". Especially desirable for use herein are biscuits, especially toasted biscuits. Especially for flakes, the forming step can first involve a substep of shaping the dough into pellets and then a finish substep of shaping the pellets into a final desired shape such as flakes.

For example, the cooked cereal dough can be fed to a pellet former to form pellets. In the preparation of R-T-E cereals in flake form, the pellets can be sized to have a pellet count of about 35 to 50 per 10 g and a moisture content of 16 to 20%. In the preparation of a flaked R-T-E cereal, the pellets can be partially dried to moisture contents of about 18 to 20%. The pellets can then be formed into "wet" flakes having a thickness of about 380 to 635 µm (0.015 to 0.025 inch), preferably while warm 76.6 to 87.8° C. (170 to 190° F.) to form desirably shaped and sized wet flakes.

Drying to Form Finished Pieces

The present methods further comprise the step of drying the shaped and sized individual pieces to form finished cereal products fortified with calcium.

The skilled artisan will appreciate that the drying step depends in important part upon the desired end product. For example, for end products in the form of puffable half products or pellets for snack production, the drying step can be practiced to provide a finish moisture content of about 10 to 15%. However, when the desired end product is an R-T-E cereal, drying the pellets to these moisture contents may only be an intermediate or substep prior to, for example, flaking the dried pellets to form "wet" flakes. These "wet" flakes can then be subjected to a finish or final drying step wherein the pieces are dried to final dried moisture contents of 1 to 4% such as by toasting.

In still another highly preferred variation, the calcium fortified dough can be extruded under conditions of temperature and pressure so as to puff and expand (the "direct expansion" technique) and sectioned or cut into individual pieces to form individual expansions puffed R-T-E cereal or snack pieces. In this variation, the forming and drying steps are practiced simultaneously rather than sequentially.

In another variation, the drying step can involve heating the pieces under conditions that not only dry the piece but also cause the piece to expand to form dried and puffed or flaked finished pieces. For example, pellets can be gun puffed to form dried puffed R-T-E cereal products. Wet flakes can be toasted to dry, expand and tenderize to form finished R-T-E cereal flakes. In other variations, the finish drying can involve or hot air or microwave heating of the pellets.

The finished calcium fortified cereal pieces, however formed, can optionally be provided with a topical sugar coating and subsequently finish dried to remove the added moisture from the sugar coating solution to form presweetened R-T-E finished cereal pieces. In other variations, an oil topical coating optionally with salt and/or flavors, is applied to form finished dried snack products. Both conventional sugar coatings and coatings employing high potency sweeteners, especially aspartame and potassium acesulfame, are known and can be used to provide presweetened cereals for use herein. The sugar coating is present in a weight ratio of sugar coating to cereal base of about 1:100 to about 50:100, preferably 10:100 to about 40:100. Typically, the sugar coating solution will have a blend of sugars and will comprise about 4 to 20% moisture. When higher amounts of the sugar coating solution, particularly for those solutions employing higher moisture levels, the slurry coated cereal pieces may be subjected to a final drying step to remove the added moisture from the sugar coating to provide finished dried products having a moisture content of about 1 to 5%.

In still another variation, the pieces or pellets can be deep fat fried to form dried puffed fried finished cereal products fortified with calcium. Such dried puffed fried finished cereal pieces are especially desirable as calcium fortified snack products. Such products can absorb about 5 to 35% of frying fat during the drying and puffing step. An advantage of half products is that they can be produced in bulk in one location and thereafter fried in one or more finish operations to form the finished snack products. Not only are shipping costs reduced due to the reduced volume of the half products compared to the finished products but also breakage of the finished product is reduced. Also, the present invention can be used to provide pretzel snack products fortified with calcium.

In commercial practice, one or more of the present methods' steps can be combined and performed in or by a single piece of equipment. For example, a dry mix of cereal ingredients including calcium can be admixed with water and/or steam in a cooker extruder such as a single screw or twin screw. The cooker extruder heats, cooks and works the cereal ingredients to form an calcium containing cooked cereal dough. In one variation, referred to in the art as direct expansion, the extruder conditions are such that upon extrusion, the cooked cereal dough expands and dries and is severed into small pieces to form R-T-E cereal pieces. The R-T-E cereal pieces can be in final form. In slight variations, the R-T-E cereal pieces can be further dried to final moisture contents, especially if a sugar coating is applied.

The R-T-E cereal pieces so prepared can then be conventionally packaged for distribution and sale.

The R-T-E cereals of the present invention can be consumed in a conventional manner to obtain the nutritional and physiological benefits of a high calcium cereal food. A surprising advantage of the present R-T-E cereals is that the calcium is nearly "invisible," that is, even high levels of calcium are barely organoleptically discernible in the finished product. Surprisingly, the finished R-T-E cereal and cereal based snack products provided herein are remarkably similar to their unfortified counterparts, notwithstanding the presence of the added calcium ingredient. The products are characterized by good flavor, good texture and other favorable organoleptic attributes.

Snack products can include all manner of essentially two dimensional shapes such as strips or ribbons (whether straight or curved), bowl or cup shaped (such as for use for dips or salsa) triangles, disks, squares or rectangles.

The present invention finds particular suitability for use in connection with puffed or expanded finished cooked cereal dough products such as puffed R-T-E cereals and puffed snacks (fried or baked). Such puffed cooked cereal dough products are characterized by specific densities ranging from about 0.2 to 0.5 g/cc. Of course, quantities of such puffed finished food products will be characterized by lower bulk densities due to their varying shapes and sizes that affect their packing factors.

The present invention is especially suitable for use to provide calcium fortified puffed children's R-T-E cereal products characterized by high levels of calcium fortification. Due to the particular taste sensibilities of children, such puffed R-T-E cereals often comprise lightly colored and flavored cereal materials derived from rice, corn (maize) and oats. While whole grain oat materials are used, generally the corn and the rice materials are not whole grain ingredients but rather comprise the starchy fraction of such cereals. That is, the bran fraction and the germ fractions are removed.

Calcium carbonate comprises about 40% calcium. While expensive, food grade calcium carbonate obtained by chemical reaction processes is desirable due to low levels of impurities, a good, inexpensive source of calcium carbonate from natural sources is ground limestone. Care should be exercised in selecting sources of ground limestone that are low in trace metals, especially such heavy metals such as lead. In particular, it is desirable that the ground limestone has trace metal concentrations of less than 10 PPM. Useful levels of calcium carbonate range from about 0.75% to 15% in the finished product. Such calcium material levels insure that the calcium content in the finished product ranges from about 100 mg per serving.

The present cooked cereal dough food products herein range in moisture broadly from about 1 to 35% moisture. The amount of moisture depends, in part, upon the particular cereal ingredients, desired intermediate or finished products, cooking equipment and drying techniques employed.

The cooked cereal dough products generally has a moisture content of about 22% to 35% moisture, preferably about 26% to 29%. Cereal pellets and/or half products generally range in moisture from about 10% to 18% moisture. Half products that are shipped to separate locations for further processing into finished products such as fried snacks preferably range from about 10% to 14% moisture to provide shelf stable products. Pellets used in R-T-E cereal plants that are typically further processed in short order and thus that do not require shelf stability can range from about 10% to 18% moisture. Finished dried R-T-E cereals can have moisture contents of about 2% to 5% while fried snack products can be 1% to 3% moisture.

Within this broad moisture range, particular preferred moisture ranges can be selected in important part upon the particular cooking technique and equipment selected. For extruder cookers, e.g., twin screw extruders, the preferred moisture content ranges from about 22 to 28%. When batch pressure cookers are employed such as is described in the '532 and/or '685 patents the moisture content is generally higher and ranged from about 26 to 30%, and most preferably about 26-28%.

A cooked cereal mash is quite similar to cooked cereal dough except that larger sized particles such as whole grains or cut grains are cooked rather than cereal flour ingredients.

These half products are useful intermediate products. Finished grain based snack products are usually provided by the deep fat frying or other puffing of the pellets (e.g., hot air or microwave heating) of partially dried half products fabricated from cooked cereal doughs. An advantage of half products is that they can be produced in bulk in one location and thereafter fried in one or more finish operations to form the finished snack products. Not only are shipping costs reduced due to the reduced volume of the half products compared to the finished products but also breakage of the finished product is reduced. Also, the present invention can be used to provide pretzel snack products fortified with calcium.

In still another variation, the dough can be sheeted to form sheets of dough (e.g., 25 to 800 microns in thickness) and the individual pieces formed by cutting the sheet into individual pieces or by stamping out shaped pieces from the dough sheet.

In still another variation, the cooked cereal dough can be extruded through a die imparting a desired peripheral shape to form an extrudate cooked cereal dough rope. The dough rope can be cut to form individual shaped pieces.

In still another variation, the cooked cereal dough can be fed to a biscuit forming device (see, for example, U.S. Pat. No. 5,342,188, entitled "Device For Crimping and Cutting Dough Ropes, issued Aug. 30, 1994 to C. E. Zimmermann, which is incorporated herein by reference) which forms the dough into biscuit shaped individual pieces.

In another preferred variation, the cooked cereal dough is formed into individual "O" shaped pieces or rings, biscuits, shreds, figurines, letters, spheres or flakes or other geometric shapes, nuggets, or even irregular shapes.

The skilled artisan will appreciate that the drying step depends importantly in part upon the desired end product. For example, for end products in the form of puffable half products or pellets for snack production, the drying step can be practiced to provide a "finish" moisture content of about 10 to 15%. However, when the desired end product is an R-T-E cereal, drying the pellets to these moisture contents may only be an intermediate or substep prior to, for example, flaking the dried pellets to form "wet" flakes. These "wet" flakes can then be subjected to a finish or final drying step wherein the pieces are dried to final dried moisture contents of 1 to 4% such as by toasting.

In still another variation, the dough can be extruded under conditions of temperature and pressure so as to puff and expand (the "direct expansion" technique) and sectioned or cut into individual pieces to form individual expansions puffed-R-T-E cereal or snack pieces.

In certain embodiments, the cooked cereal dough can be puffable such as by deep fat frying, microwave heating, gun puffing, jet zone heating, etc.

In another variation, the drying step can involve heating the pieces under conditions that not only dry the piece but also cause the piece to expand to form dried and puffed or flaked finished pieces. For example, pellets can be gun puffed to form dried puffed R-T-E cereal products. The wet flakes can be toasted to dry, expand and tenderize to form finished R-T-E cereal flakes.

In still another variation, the pieces or pellets can be deep fat fried to form dried puffed fried finished cereal products fortified with calcium. Such dried puffed fried finished cereal pieces are especially desirable as calcium fortified snack products. Such products can absorb about 5 to 35% of frying fat during the drying and puffing step.

The dried cereal pieces, however realized, can optionally be provided with a topical sugar coating and subsequently dried to remove the moisture added by the sugar coating solution to form presweetened R-T-E finished cereal pieces. In other variations, an oil topical coating optionally with salt and/or flavors, is applied to form finished dried snack products. Both conventional sugar coatings and coatings employing high potency sweeteners, especially aspartame and potassium acesulfame, are known and can be used to provide presweetened cereals for use herein.

If employed, the topical sweetening is applied in sufficient amounts such that after drying to remove added moisture associated with the sugar coating solution, the sugar coating is present in a weight ratio of sugar coating to cereal base of about 1:100 to about 50:100, preferably 10:100 to about 40:100 and for best results about 25:100 to about 35:100. Typically, the sugar coating solution will have a blend of sugars and will comprise about 4 to 20% moisture. When higher amounts of the sugar coating solution, particularly for those solutions employing higher moisture levels, the slurry coated cereal pieces may be subjected to a final drying step to remove the added moisture from the sugar coating to provide finished dried products having a moisture content of about 1 to 5%.

The R-T-E cereal pieces so prepared can then be conventionally packaged for distribution and sale.

In still other variations, the present finished dried food products are admixed with other dry snack ingredients (e.g., peanuts, pretzels, and other cereal pieces) to form a mixed aggregate snack product.

The finished dried R-T-E cereal and cereal based snack products fabricated from the calcium fortified cooked cereal doughs herein are useful as nutrient fortified food products. Surprisingly, the finished R-T-E cereal and cereal-based snack products provided herein are remarkably similar to their unfortified counterparts, even though containing the added calcium ingredient. Good flavor, good texture and other favorable organoleptic attributes characterize the products. Notwithstanding their highly acceptable taste, appearance and texture attributes, the products are nonetheless characterized as having high levels of calcium. The present finished products are remarkably free of the undesirable discoloration heretofore associated with finished light colored dried cereal products high in calcium content.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes, which come within the meaning and range of equivalency of the claims, are intended to be embraced therein.

What is claimed is:

1. A food product fortified with calcium comprising:
   A. a body of a cooked dough composition formed from a starchy cereal ingredient;
   B. a first calcium fortifying ingredient; and
   C. at least one second calcium fortifying ingredient, which is different than the first calcium fortifying ingredient, that provides at least 20% of its weight of calcium, wherein a ratio of the first calcium fortifying ingredient to the at least one second calcium fortifying ingredient is at least 1:1.

2. The food product of claim 1, wherein the first calcium fortifying ingredient constitutes calcium phosphate.

3. The food product of claim 2, wherein the at least one second calcium fortifying ingredient constitutes calcium carbonate.

4. The food product of claim 3, wherein the ratio of calcium phosphate to calcium carbonate is greater than or equal to 2:1.

5. The food product of claim 2, wherein at least a portion the calcium phosphate is tricalcium phosphate.

6. The food product of claim 2, wherein the calcium phosphate is present in sufficient amounts to provide a total calcium content of at least 3% (dry weight basis).

7. The food product of claim 2, wherein the calcium phosphate has a median particle size of about 5 to 12 microns.

8. The food product of claim 1, wherein each of the first and second calcium fortifying ingredients are insoluble.

9. The food product of claim 1, wherein the food product constitutes a puffed cereal food product.

10. The food product of claim 1, further comprising: a sugar coating.

11. The food product of claim 1, wherein the food product is free of a calcium sequestrate.

12. The food product of claim 1, further comprising: a corn or malt syrup.

13. The food product of claim 1, wherein the starchy cereal ingredient constitutes about 40% to 90% of the cooked dough composition.

14. A method of making calcium fortified food products comprising:
   A. forming a calcium fortified dough having sufficient amounts of a first calcium fortifying ingredient to provide a total calcium content of at least 0.8% (dry weight basis) and a second calcium fortifying ingredient, which is different from the first calcium fortifying ingredient, to further increase the total calcium content, wherein a ratio of the first calcium fortifying ingredient to the second calcium fortifying ingredient is at least 1:1;
   B. cooking the calcium fortified dough to form cooked calcium fortified dough;
   C. forming the cooked calcium fortified dough into calcium fortified dough pieces; and D. puffing the calcium fortified dough pieces to form the calcium fortified products puffed to a density of about 0.2 to 0.5 g/cc and fortified with high levels of calcium.

15. The method of claim 14, further comprising: providing the first calcium fortifying ingredient at a median particle size of no larger than 15 microns in forming the calcium fortified dough.

16. The method of claim 14, further comprising: adding a sugar ingredient such that the cooked calcium fortified dough has about 5% to 10% sugar.

17. The method of claim 14, further comprising: toasting the puffed calcium fortified products.

18. The method of claim 14, further comprising: employing calcium phosphate for the first calcium fortifying ingredient and calcium carbonate for the second calcium fortifying ingredient, wherein the ratio of calcium phosphate to calcium carbonate is greater than or equal to 2:1.

19. The method of claim 14, wherein the calcium fortified food products are formed free of a calcium sequestrate.

20. The food product prepared by the method of claim 14.

21. The food product prepared by the method of claim 18.

\* \* \* \* \*